US009754332B2

(12) United States Patent
Berntsson et al.

(10) Patent No.: US 9,754,332 B2
(45) Date of Patent: *Sep. 5, 2017

(54) PREDICTING ACCOUNT HOLDER TRAVEL WITHOUT TRANSACTION DATA

(71) Applicant: MasterCard International Incorporated, Purchase, NY (US)

(72) Inventors: Kent Olof Niklas Berntsson, Rye, NY (US); Romina Mariel Abal, New York, NY (US)

(73) Assignee: MARTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,093

(22) Filed: Jun. 13, 2016

(65) Prior Publication Data

US 2016/0300314 A1    Oct. 13, 2016

Related U.S. Application Data

(63) Continuation of application No. 14/503,815, filed on Oct. 1, 2014, now Pat. No. 9,367,871.

(51) Int. Cl.
| | |
|---|---|
| G07B 15/02 | (2011.01) |
| G06Q 50/14 | (2012.01) |
| G06Q 40/00 | (2012.01) |
| G06Q 10/02 | (2012.01) |
| G06Q 20/40 | (2012.01) |

(52) U.S. Cl.
CPC ............ *G06Q 50/14* (2013.01); *G06Q 10/02* (2013.01); *G06Q 20/4016* (2013.01); *G06Q 40/00* (2013.01)

(58) Field of Classification Search
CPC ................... G06Q 10/0833; G06Q 30/0202
USPC .................................................. 235/379, 384
See application file for complete search history.

(56) References Cited

U.S. PATENT DOCUMENTS

| | | | |
|---|---|---|---|
| 5,732,400 | A | 3/1998 | Mandler et al. |
| 6,035,285 | A | 3/2000 | Schlect et al. |
| 7,203,665 | B2 | 4/2007 | Donner |
| 9,367,871 | B2 | 6/2016 | Berntsson et al. |
| 2004/0064405 | A1 | 4/2004 | Weichert et al. |
| 2005/0097051 | A1 | 5/2005 | Madill et al. |
| 2005/0107997 | A1 | 5/2005 | Watts et al. |
| 2006/0010101 | A1 | 1/2006 | Suzuki et al. |
| 2007/0094061 | A1 | 4/2007 | Hu et al. |
| 2007/0118449 | A1 | 5/2007 | De La Motte |
| 2007/0203732 | A1 | 8/2007 | Griegel et al. |
| 2007/0294195 | A1 | 12/2007 | Curry et al. |
| 2008/0281741 | A1 | 11/2008 | Hyde |
| 2010/0274649 | A1 | 10/2010 | Smith |
| 2010/0301114 | A1 | 12/2010 | Lo Faro et al. |
| 2011/0302011 | A1 | 12/2011 | Yoder et al. |
| 2013/0046717 | A1 | 2/2013 | Grigg et al. |
| 2015/0046220 | A1 | 2/2015 | Gerard et al. |
| 2015/0046302 | A1 | 2/2015 | Hu et al. |
| 2015/0235222 | A1 | 8/2015 | Howe et al. |

(Continued)

OTHER PUBLICATIONS

U.S. Appl. No. 13/964,728, filed Aug. 12, 2013, Gerard et al.

*Primary Examiner* — Jamara Franklin
(74) *Attorney, Agent, or Firm* — Ballard Spahr LLP

(57) ABSTRACT

A system, method, and computer-readable storage medium configured to anticipate travel by payment account holders without using payment transaction data.

20 Claims, 3 Drawing Sheets

(56) References Cited

U.S. PATENT DOCUMENTS

2015/0235321 A1 8/2015 Unser et al.
2016/0232576 A1 8/2016 Chauhan et al.

PREDICTING ACCOUNT HOLDER TRAVEL WITHOUT TRANSACTION DATA

RELATED APPLICATION

The present application is a continuation of U.S. patent application Ser. No. 14/503,815, filed Oct. 1, 2014, and issued as U.S. Pat. No. 9,367,871.

BACKGROUND

Field of the Disclosure

Aspects of the disclosure relate in general to financial services. Aspects include a method and a decision making platform to identify travel by payment account holders, and more particularly, to reduce fraudulent transactions involving payment cards without utilizing account holder transaction data.

Description of the Related Art

A payment card is a card that can be used by an account holder and accepted by a merchant to make a payment for a purchase or in payment of some other obligation. Payment cards include credit cards, debit cards, charge cards, and Automated Teller Machine (ATM) cards. Payment cards provide the clients of a financial institution ("account holders") with the ability to pay for goods and services without the inconvenience of using cash.

The payment industry suffers from problems stemming from cross-border travel by account holders. One problem is that fraud rates in cross-border transactions (in which the account holder is from a different country than a merchant) are much higher than those experienced on domestic transactions. These high fraud rates make it risky for the card issuing financial institution ("issuers") to approve cross-border transactions. As a result, issuers often attempt to mitigate the risk by declining cross-border transactions at higher rates than domestic transactions. While these higher decline rates may minimize the issuing bank's fraud exposure, it inconveniences the account holder, deprives the merchant of a sale, and deprives the issuer of incremental revenue on the purchase.

Generally, at least one payment card network ("payment network") currently provides fraud scoring for electronic payment transactions. Fraud scoring refers to an indication, or likelihood, that a payment transaction is fraudulent. In one fraud scoring system, the payment card network provides a number back to the payment card issuer between zero and 1,000, which translates into zero and 100 percent, in tenths of percentage points. To provide fraud scoring capability, various vendors or payment card networks provide and market various different fraud scoring products. A payment card network generally selects one of the vendor products to provide its customers (the card issuers) with one of fraud scoring and credit risk scoring that is accessible, for example, on a payment card network.

SUMMARY

Embodiments include a system, device, method and computer-readable medium to anticipate travel by payment account holders without using payment transaction data.

In one embodiment, a system includes a network interface and a processor. The network interface is configured to receive cookie data. The cookie data includes a plurality of cookies. Each cookie contains: an Internet Protocol address associated with a browsing computer and a web site address. The processor is configured to identify a travel-related cookie from the plurality of cookies. When the web site address of the travel-related cookie is associated with a travel web site, the processor is further configured to identify a customer account associated with the travel-related cookie by comparing the Internet Protocol address of the browsing computer with a database of known customer Internet Protocol addresses. The database is stored on a non-transitory computer-readable storage medium. The customer account contains contact information of the customer. The network interface is further configured to use the contact information to send the customer a travel-related notification.

DETAILED DESCRIPTION

One aspect of the disclosure includes the realization that anticipated account holder travel data may be incorporated as a factor to vendor fraud scoring products in the authorization of cross-border transactions. In another aspect, knowledge of anticipated account holder travel may facilitate useful travel-related offers to account holders. Further, a system and method may anticipate account holder travel from account holder interactions on the Internet. In such a system, the payment card network receives and combines the anticipated travel into a travel database.

While embodiments described herein are applied to a cross-border context, it is understood by those familiar with the art that the concepts, apparatus, system and methods described herein may also be applicable to domestic travel that is far from an account holder's usual area of residence.

In an alternate embodiment, a travel-rules based engine may be used in addition to score-based fraud detector.

As described herein, the term "payment card" includes physical cards, such as credit cards, charge cards, and debit cards, but also includes any other devices that may hold payment account information, such as mobile phones, personal digital assistants (PDAs), electronic wallets, and key fobs.

The systems and processes are not limited to the specific embodiments described herein. In addition, components of each system and each process can be practiced independently and separately from other components and processes described herein. Each component and process also can be used in combination with other assembly packages and processes.

Figure 1:
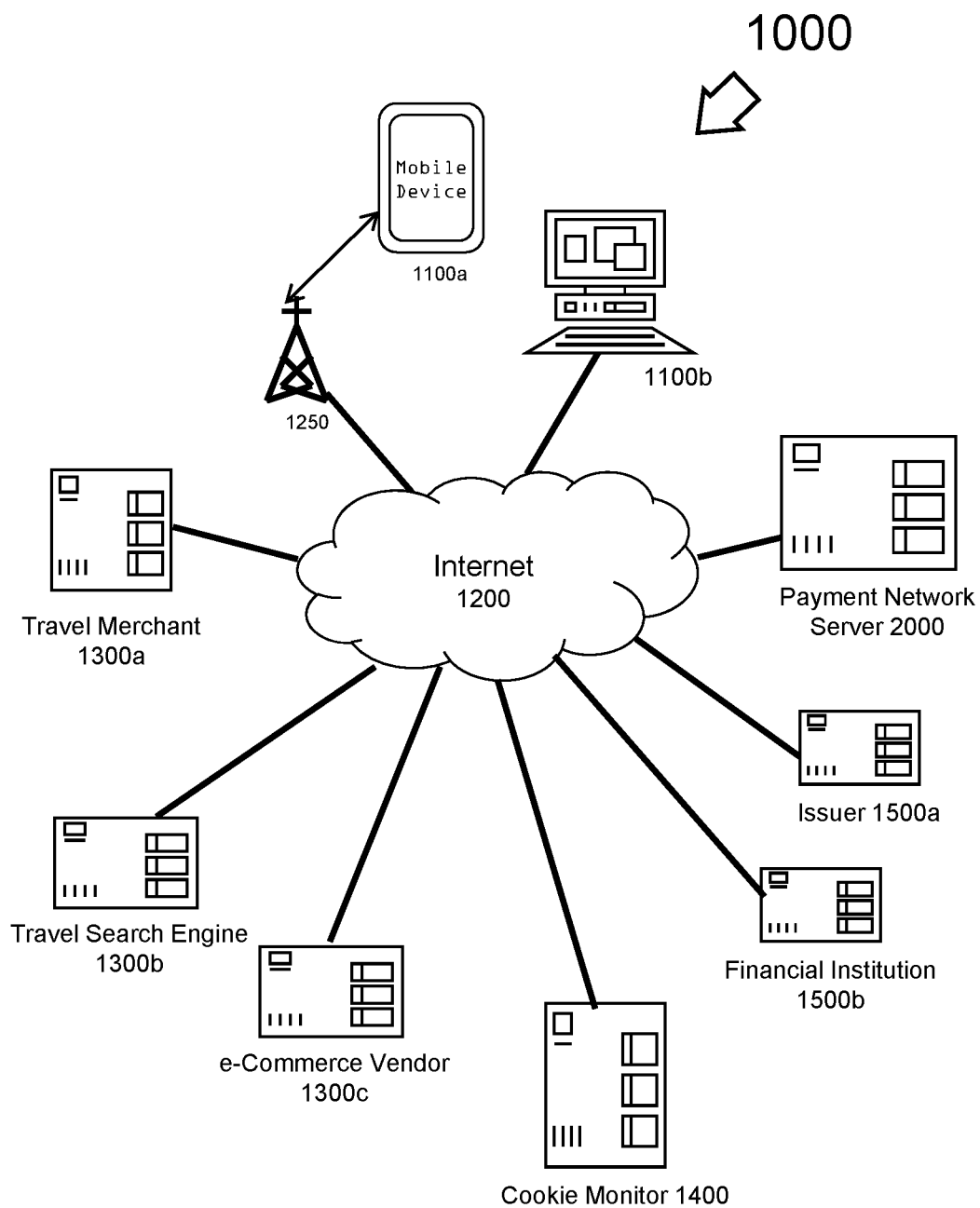
FIG. 1 is a block diagram illustrating a system to identify travel by payment account holders without utilizing account holder transaction data.

FIG. 1 is a block diagram 1000 illustrating a system to identify travel by payment account holders without utilizing account holder transaction data. The present disclosure is related to a payment card payment system, such as a credit card payment system using the MasterCard® interchange, Cirrus® network, or Maestro®. The MasterCard interchange is a proprietary communications standard promulgated by MasterCard International Incorporated for the exchange of financial transaction data between financial institutions that are customers of MasterCard International Incorporated. Cirrus is a worldwide interbank network operated by MasterCard International Incorporated linking debit and payment cards to a network of ATMs throughout the world. Maestro is a multi-national debit card service owned by MasterCard International Incorporated.

In such system, account holders may use a mobile device 1100a (such as key fobs, mobile phones, tablet computers, electronic wallets and the like), or computers 1100b to contact websites 1300 over a Wide Area Network (WAN) such as the Internet 1200. It is understood that some mobile devices 1100a may connect to the Internet 1200 via a mobile telephony network 1250. Example websites 1300 (also referred to as "web servers") include travel merchants 1300a (such as travel agents, airlines, railways, cruise companies, and the like), travel search engines 1300b, and e-commerce vendors 1300c. As part of their operation, websites 1300 may leave a small piece of data called a "cookie" stored on the mobile device 1100a or computer 1100b web-browser while the account holder is browsing the website 1300.

When the computing device 1100 loads the website 1300, the browser sends the cookie back to the website 1300 informing a web server of the user's previous activity. Cookies were designed to be a reliable mechanism for websites to remember state information (such as items in a shopping cart) or to record the user's browsing activity (including clicking particular buttons, logging in, or recording which pages were previously visited by the user).

Cookies may be used to track an account holder's web browsing. While tracking can also be done by using the IP address of the computer 1100 requesting the page or the referrer field of the HTTP request header, cookies allow for greater precision.

A cookie monitor 1400 is a server that monitors the cookies of a computing device 1100. In some embodiments, a reference to the cookie monitor 1400 is embedded into the pages of the website 1300. In other embodiments, the cookie monitor 1400 is the website 1300 itself. When the account holder requests a page of a website 1300, but the request contains no cookie, the website 1300 presumes that this is the first web page visited by the customer; the website 1300 creates a random string and sends it as a cookie back to the browser together with the requested page. From this point on, the cookie will automatically be sent by the browser to the website 1300 every time a new page is requested. Partnering with the website 1300, the website 1300 sends the page as usual, but the cookie monitor 1400 also stores the URL of the requested page, the date/time of the request, and the cookie in a log file. By analyzing the log file collected in the process, cookie monitor 1400 determines which pages the account holder has visited, in what sequence, and for how long.

The account holder computers may also connect to financial institutions 1500a-b and a payment network server 2000 over the Internet 1200.

A financial institution 1500 is a bank, credit union, or other financial institution known in the art. An issuer 1500a is a financial institution that issues a payment card or an electronic account to a consumer, who uses payment card or electronic account to tender payment for a purchase from a merchant or withdraw cash from an Automated Teller Machine. Payment cards are associated with a payment network 2000. A payment network 2000 is an operational network that links merchants and financial institutions 1500, established to affect the transfer of monetary value between parties. An example payment network 2000 is MasterCard International Incorporated of Purchase, New York.

Figure 2:
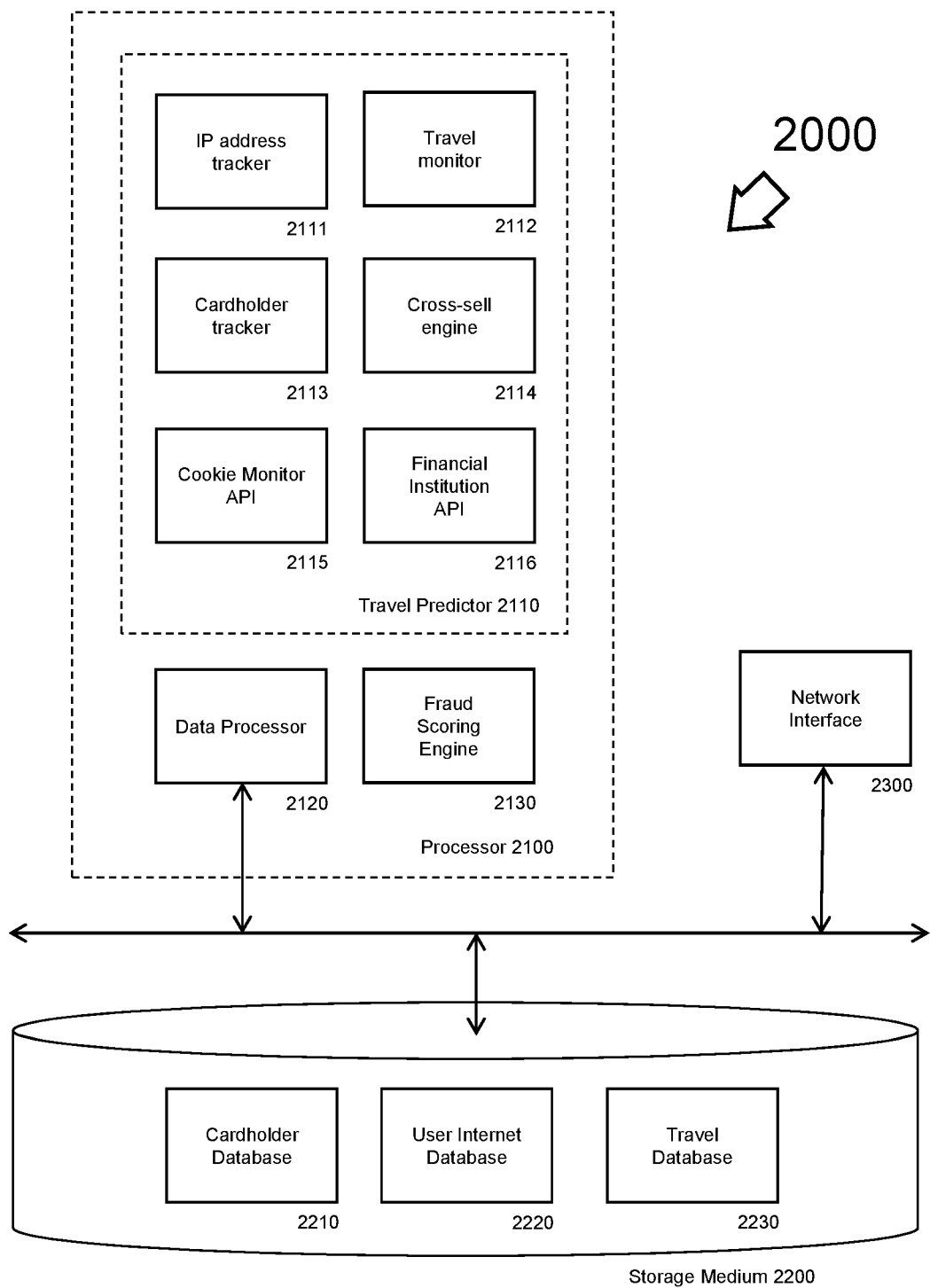
FIG. 2 is an expanded block diagram of an exemplary embodiment of a server architecture of a payment processor embodiment configured to identify travel by payment account holders without utilizing account holder transaction data.

Embodiments will now be disclosed with reference to a block diagram of an exemplary payment network server 2000 of FIG. 2 configured to identify anticipated travel by payment account holders without utilizing account holder transaction data, constructed and operative in accordance with an embodiment of the present disclosure.

Payment network server 2000 may run a multi-tasking operating system (OS) and include at least one processor or central processing unit (CPU) 2100, a non-transitory computer-readable storage medium 2200, and a network interface 2300.

Processor 2100 may be any central processing unit, microprocessor, micro-controller, computational device or circuit known in the art.

As shown in FIG. 2, processor 2100 is functionally comprised of a fraud scoring engine 2130, a travel predictor 2110, and a data processor 2120.

Data processor 2120 interfaces with storage medium 2200 and network interface 2300. The data processor 2120 enables processor 2100 to locate data on, read data from, and writes data to, these components.

Fraud scoring engine 2130 is the structure that enables anti-fraud scoring or rules-based fraud-prevention of a financial transaction, and may store its customer-related fraud scoring information in a cardholder database 2210.

Travel predictor 2110 is the structure that anticipates future travel by account holders. Embodiments of travel predictor 2110 may monitor IP addresses, map the known IP addresses of account holders, anticipate travel by account holders, and cross-sell account holders travel related services. In some embodiments, travel predictor 2110 may also communicate with fraud scoring engine 2130 to factor travel by account holders into fraud scoring. Travel predictor 2110 may further comprise: an IP address tracker 2111, travel monitor 2112, cardholder tracker 2113, cross-sell engine 2114, cookie monitor API 2115, and financial institution API 2116

IP address tracker 2111 is any structure that tracks Internet Protocol addresses, and may store its data in a user internet database 2220.

Travel monitor 2112 is configured to analyze cookies and Internet Protocol addresses to identify anticipated future travel, and may store its determination in a travel database 2230. Travel database 2230 may additionally contain the Internet Protocol addresses or Uniform Resource Locator ("URL", also known as a "web address") of known travel websites 1300a-c.

Cardholder tracker 2113 is configured to track and associate account holders with Internet Protocol addresses, and may do so in coordination with a cardholder database 2210.

Cross-sell engine 2114 is a structure configured to take account holder anticipated travel determinations to provide useful information, such as targeted information and/or advertisements about the anticipated travel destination. For example, cross-sell engine 2114 electronically notify account holders about travel deals at the anticipated travel destination, such as restaurants, hotels, rental cars, or any other goods or services.

Cooke monitor API 2115 is the electronic protocols and interface that allows travel predictor 2110 to communicate with a cookie monitor 1400 via the network interface 2300.

Similarly, financial institution API 2116 is the electronic protocols and interface that allows travel predictor 2110 to communicate with a financial institution 1500 via the network interface 2300.

Figure 3:
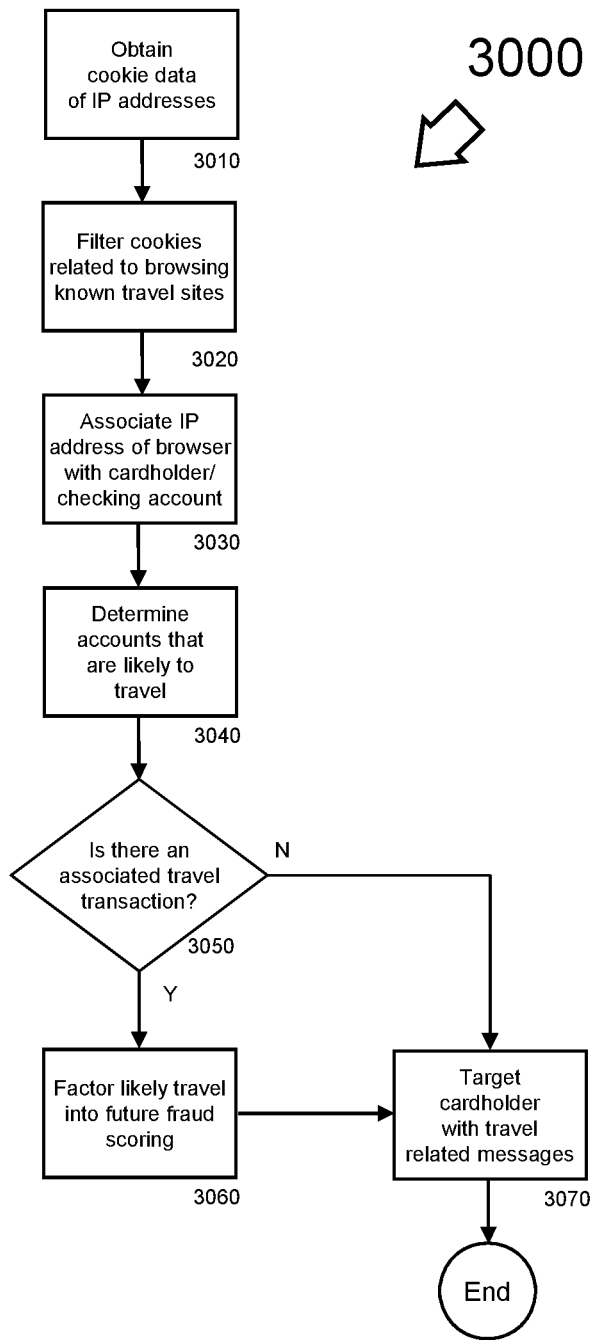
FIG. 3 illustrates a non-real time clearing process to identify travel by payment account holders without utilizing account holder transaction data.

The functionality of these structures is elaborated in greater detail in FIG. 3.

These structures may be implemented as hardware, firmware, or software encoded on a computer readable medium, such as storage medium 2200. Further details of these components are described with their relation to method embodiments below.

Computer-readable storage medium 2200 may be a conventional read/write memory such as a magnetic disk drive, floppy disk drive, optical drive, compact-disk read-only-memory (CD-ROM) drive, digital versatile disk (DVD) drive, high definition digital versatile disk (HD-DVD) drive, Blu-ray disc drive, magneto-optical drive, optical drive, flash memory, memory stick, transistor-based memory, magnetic tape or other computer-readable memory device as is known in the art for storing and retrieving data. In some embodiments, computer-readable storage medium 2200 may be remotely located from processor 2100, and be connected to processor 2100 via a network such as a local area network (LAN), a wide area network (WAN), or the Internet.

In addition, as shown in FIG. 2, storage medium 2200 may also contain a cardholder database 2210, a user internet database 2220, and a travel database 2230. It is understood by those familiar with the art that one or more of these databases 2210-2230 may be combined in a myriad of combinations.

Network interface 2300 may be any data port as is known in the art for interfacing, communicating or transferring data across a computer network, examples of such networks include Transmission Control Protocol/Internet Protocol (TCP/IP), Ethernet, Fiber Distributed Data Interface (FDDI), token bus, or token ring networks. Network interface 2300 allows payment network server 2000 to communicate with computing devices 1100, websites 1300, cookie monitor 1400, or financial institutions 1500.

We now turn our attention to method or process embodiments of the present disclosure, FIG. 3. It is understood by those known in the art that instructions for such method embodiments may be stored on their respective computer-readable memory and executed by their respective processors. It is understood by those skilled in the art that other equivalent implementations can exist without departing from the spirit or claims of the invention.

Embodiments create correlate Internet Protocol addresses with account holders, and create an internet-search profile to anticipate account holder travel to a destination.

We now turn our attention to methods illustrated in FIG. 3.

FIG. 3 illustrates a process 3000 in which anticipated travel is extracted from the Internet web surfing by account holders, constructed and operative in accordance with an embodiment of the present disclosure. It is understood by those familiar with the art that process 3000 may be a non-real time clearing process, but in alternate embodiments may be a real time process. Conventionally, a clearing process is a non-real time process.

At block 3010, payment network 2000 receives cookie data of IP addresses from a cookie monitor 1400. The cookie data is received electronically via the network interface 2300 and the cookie monitor API 2115, and may be part of data from many transactions received via a batch process. The cookie data includes the Internet Protocol address or URL of a computer 1100 and the website 1300 visited. The website 1300 visited may include travel sites such as airlines, hotels, travel search web sites, or travel agencies.

The cookies are filtered by travel monitor 2112 to browsing related to known travel websites 1300a-c at block 3020.

As mentioned above, the Internet Protocol address or web address of known travel websites may be stored in travel database 2230.

At block 3030, IP address tracker 2111 associates the IP address of the computer browser with an account holder or account holder account. In some embodiments, the association may be made with an account. The association can be accomplished by matching the IP address of the cookie with the IP address of the account holder (account holder) stored in user internet database 2220. Once the association is made, and the account holder is identified, the account holder accounts that are likely to travel are identified, block 3040.

Account holder information may be retrieved from cardholder database 2210 by cardholder tracker 2113 and used to determine whether there is an associated travel transaction at decision block 3050. An associated travel transaction may be the purchase of a plane or rail ticket, rental car reservation, cruise reservation, travel agency expense or other financial transaction related to travel.

When there is an associated travel transaction, the travel predictor 2110 informs the fraud-scoring engine 2130 to factor in the anticipated travel into the future fraud scoring, block 3060. Additionally, in some embodiments, the issuer 1500a is informed of the anticipated travel via the financial institution API 2116 and network interface 2300.

Once the anticipated travel is factored into the fraud scoring, the account holder is targeted with travel related messages by cross-sell engine 2114 at block 3070. The travel related messages may take a variety of forms including mailings via the postal service or electronic messages such as electronic mail, text messages, or notifications via an application running on computer 1100. The travel related messages may include weather reports for the anticipated travel location, advertisements or promotions from travel-related merchants or vendors, advertisements or promotions from travel locations and the like. In some embodiments, the travel related message may remind the account holder to use their payment card while traveling. Messages may also remind account holders of any payment card usage requirements or ask the account holder to let the issuer financial institution know the travel destination to improve fraud monitoring and any offers. The travel related messages may vary depending upon whether a travel-related transaction has occurred.

If, at block 3050, there is no associated travel transaction, there is no need to factor the anticipated travel into the future fraud scoring and so the process proceeds directly to block 3070.

If the financial institution has not seen a transaction come through, although the account holder has visited many travel sites, it is possible that the account holder paid with a payment card issued by a competitor. The reminder can therefore be used to: 1) remind the account holder to use a specific payment card; or 2) use the payment card while traveling and pay for the trip if the trip is not yet purchased.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What is claimed is:

1. A method of anticipating future travel, the method comprising:
    identifying a travel-related cookie from a plurality of cookies with a processor, when a web site address of the travel-related cookie is associated with a travel web site, each cookie of the plurality of cookies containing: an Internet Protocol address associated with a browsing computer and the web site address;
    identifying, with the processor, a customer account associated with the travel-related cookie by comparing the Internet Protocol address of the browsing computer with a database of known customer Internet Protocol addresses, the database being stored on a non-transitory computer-readable storage medium, the customer account containing contact information of the customer;
    using the contact information to send the customer a travel-related notification via a network interface.

2. The method of claim 1, wherein the travel web site is an airline, hotel, travel search web site, or travel agency.

3. The method of claim 2, further comprising:
    determining, with the processor, an associated travel transaction using the customer account.

4. The method of claim 3, wherein the associated travel transaction is a purchase of a plane ticket, purchase of a rail ticket, rental car reservation, or cruise reservation.

5. The method of claim 4, wherein the customer account further contains a Primary Account Number or checking account number.

6. The method of claim 5, further comprising:
    factoring the associated travel transaction into future fraud scoring with the processor.

7. The method of claim 6, wherein the travel-related notification is via an electronic mail notification, a text message, or an application running on the browsing computer.

8. A system of anticipating future travel, the system comprising:
    a processor configured to identify a travel-related cookie from a plurality of cookies with a processor, when a web site address of the travel-related cookie is associated with a travel web site, each cookie of the plurality of cookies containing: an Internet Protocol address associated with a browsing computer and the web site address, the processor further configured to identify a customer account associated with the travel-related cookie by comparing the Internet Protocol address of the browsing computer with a database of known customer Internet Protocol addresses, the database being stored on a non-transitory computer-readable storage medium, the customer account containing contact information of the customer; and
    a network interface is configured to use the contact information to send the customer a travel-related notification.

9. The system of claim 8, wherein the travel web site is an airline, hotel, travel search web site, or travel agency.

10. The system of claim 9, wherein the processor is further configured to determine an associated travel transaction using the customer account.

11. The system of claim 10, wherein the associated travel transaction is a purchase of a plane ticket, purchase of a rail ticket, rental car reservation, or cruise reservation.

12. The system of claim 11, wherein customer account further contains a Primary Account Number or checking account number.

13. The system of claim 12, further comprising:
    factoring the associated travel transaction into future fraud scoring with the processor.

14. The system of claim 13, wherein the travel-related notification is via an electronic mail notification, a text message, or an application running on the browsing computer.

15. A non-transitory computer readable medium encoded with data and instructions, when executed by a computing device the instructions causing the computing device to:
    identify a travel-related cookie from a plurality of cookies with a processor, when a web site address of the travel-related cookie is associated with a travel web site, each cookie of the plurality of cookies containing: an Internet Protocol address associated with a browsing computer and the web site address;
    identify, with the processor, a customer account associated with the travel-related cookie by comparing the Internet Protocol address of the browsing computer with a database of known customer Internet Protocol addresses, the database being stored on a non-transitory computer-readable storage medium, the customer account containing contact information of the customer;
    use the contact information to send the customer a travel-related notification via a network interface.

16. The non-transitory computer-readable storage medium of claim 15, wherein the travel web site is an airline, hotel, travel search web site, or travel agency.

17. The non-transitory computer-readable storage medium of claim 16, wherein the processor is further configured to:
    determine an associated travel transaction using the customer account.

18. The non-transitory computer-readable storage medium of claim 17, wherein the associated travel transaction is a purchase of a plane ticket, purchase of a rail ticket, rental car reservation, or cruise reservation.

19. The non-transitory computer-readable storage medium of claim 18, wherein the customer account further contains a Primary Account Number or checking account number.

20. The non-transitory computer-readable storage medium of claim 15, further comprising:
    factoring the associated travel transaction into future fraud scoring with the processor.

* * * * *